Feb. 9, 1932.  W. H. BENJAMIN  1,844,554
MILK STRAINER
Filed Jan. 10, 1929
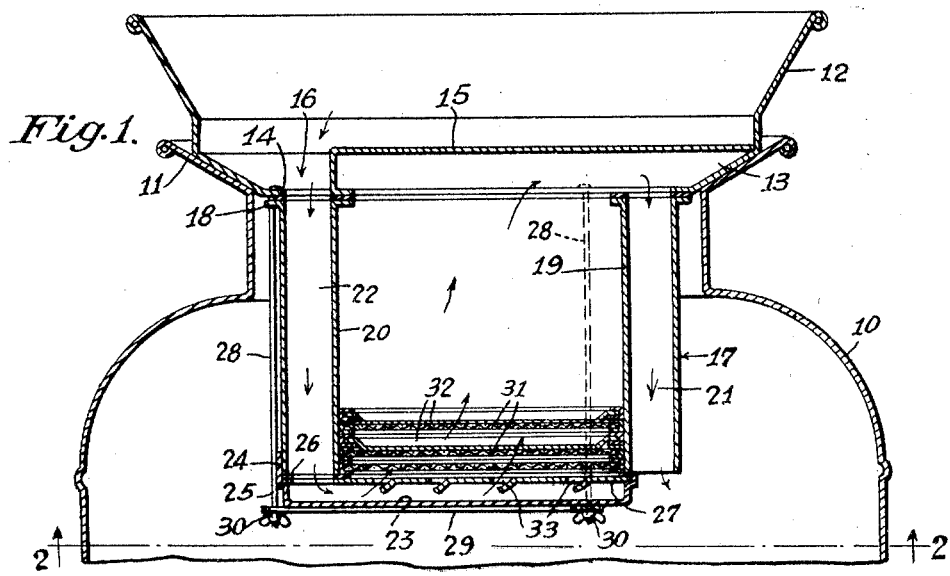
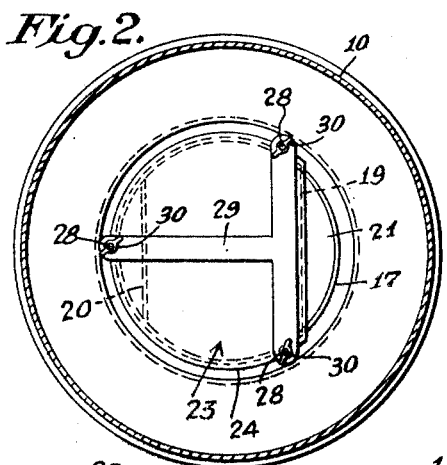 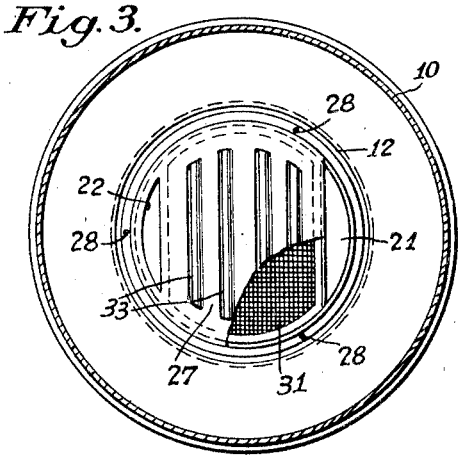
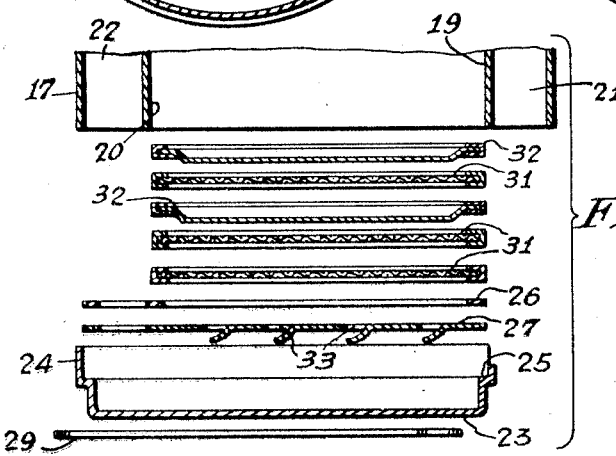
Inventor
Wm. H. Benjamin
F. M. Gilbert, Atty.

Patented Feb. 9, 1932

1,844,554

UNITED STATES PATENT OFFICE

WILLIAM H. BENJAMIN, OF BINGHAMTON, NEW YORK

MILK STRAINER

Application filed January 10, 1929. Serial No. 331,486.

My invention pertains to milk strainers and it has for its object to provide a milk strainer to be removably mounted in the mouth of a milk can and into which strainer the milk, as produced from the cow in the milk pail can be poured from the pail into the strainer and strained and purified by a system of vertical upward contact with straining surfaces therein, and whereby the impurities of the milk are fully eliminated from the body of the liquid after having passed thru the strainer and before it passes into the milk can.

With these objects in view my invention consists of certain novel features of construction and arrangement of parts as will be hereinafter more particularly described and pointed out in the claims. Reference is had to the accompanying drawings in which:

Figure 1 is a fragmentary vertical sectional view through a milk can illustrating the invention.

Figure 2 is a sectional view taken on line 2—2 of Figure 1

Figure 3 is a similar view with the bottom member of the receptacle removed.

Figure 4 is a fragmentary sectional view showing the parts separated.

Referring to the drawings in detail 10 indicates a milk can of ordinary well known construction, the neck of which is characterized by an outwardly flared flange 11. Reposing upon this flange is a hopper 12 characterized by a lower inwardly inclined flange 13 that rests upon the flange 11 of the milk can. This flange 13 projects a slight distance within the neck portion of the can, and terminates to provide a horizontal marginal flange portion 14, the purpose of which will be presently described. The hopper 12 is also provided with a bottom 15 which extends across the major portion of the hopper, but terminates short of one side thereof to provide an opening 16 through which the milk is allowed to enter the strainer and subsequently pass into the can.

The strainer comprises a cylindrical receptacle 17, the upper edge of which is formed with a flange 18 arranged in contacting engagement with the flange 14 of the hopper and secured thereto in any suitable manner. The receptacle 17 is divided by vertical partitions 19 and 20 to provide diametrically opposed passages for the milk, which passages are indicated at 21 and 22 respectively. The passage 22 coincides with the opening 16 of the hopper, so that the milk passing from the hopper enters the passage 22, then passes through the main body of the strainer, and finally passes out through the passage 21 in entering the milk can 10. This course pursued by the milk while being strained before entering the can 10 is indicated in by arrows in Figure 1.

The receptacle 17 is provided with a removable bottom 23 which is characterized by an annular flange 24, the latter being also formed to provide a shoulder 25, so that when the bottom is associated with the receptacle, one side or portion of the receptacle 17 and the partition 19 engage the shoulder 25, although interposed between these parts is a washer 26 and a metallic disk 27. This construction is clearly illustrated in Figures 1 and 4, and it will be noted upon inspection of Figure 1 that the bottom 23 is held fixed relatively to the receptacle and its associated parts by means of rods 28. These rods pass through openings formed in a substantially T-shaped clamping element 29, clearly illustrated in Figure 2, while the upper ends of these rods pass through the flanges 14 and 18 above referred to, and thereby hold the receptacle and the hopper connected together. The upper ends of the rods are headed, while the lower ends of the rods have thumb nuts 30 associated therewith so that the component parts of the device can be quickly assembled or disassembled for any purpose whatsoever, and as the occasion may require.

Arranged within the body of the receptacle 17, that is between the partitions 19 and 20 respectively, is a plurality of strainer units, adapted to repose one upon the other. Certain of these units are in the nature of metallic foraminated disks and indicated at 31, while interposed between these disks, is a strainer including a body of fabric indicated at 32, while an element of similar construction constitutes the uppermost element of the series of strainers as clearly illustrated in Figure 4. The lowermost metallic disk-like strainer 27 is provided with a plurality of slots or passages 33.

In practice the milk is poured into the hopper 12, passing therefrom through the opening 16 into the passage 22, and thence through the bottom 23 upwardly into the cylindrical receptacle between the partitions 19 and 20 respectively. Obviously the milk passes through the series of strainers and is relieved of all foreign matter, and as the milk passes out of the receptacle 17 it is deflected by the bottom 15 of the hopper and caused to flow into the passage 21, through which the milk escapes into the can 10.

While it is believed that from the foregoing description the nature and advantages of the invention will be readily apparent, I desire to have it understood, that I do not limit myself to what is herein shown and described and that such changes may be resorted to when desired as fall within the scope of what is claimed.

What is claimed is:

1. In a milk strainer, a receptacle divided to provide a central chamber and passages on either side thereof, a plurality of strainers located in the lower portion of said chamber, said receptacle including a separable bottom member defining a chamber beneath said strainers in communication with one of said passages, a hopper supported by the upper edge of the receptacle and having an opening communicating with the last mentioned passage, said hopper including a bottom disposed above the upper end of the other passage, and means for securing the said bottom member of the receptacle to the receptacle.

2. In a milk strainer, a receptacle having a central chamber and passages on either side thereof, a plurality of strainers arranged in superimposed relation in the lower portion of the chamber, said receptacle including a separable bottom member defining a chamber beneath said strainers in communication with one of said passages, a hopper reposing upon the upper edge of the receptacle and including a bottom terminating short of one side of the hopper to provide an opening establishing communication between the latter and the last mentioned passage, the bottom of said hopper being disposed above the upper end of the other passage, and means for securing the hopper and the bottom member of the receptacle to the opposed ends of the receptacle.

3. In a milk strainer, a receptacle having a central chamber and diametrically opposed passages on either side thereof, a plurality of strainers arranged in superimposed relation in the lower portion of said chamber, said receptacle including a separable bottom member wholly disposed to one side of one of said passages, and defining a chamber beneath said strainers in communication with the other of said passages, a hopper reposing on the upper end of the receptacle, and including a bottom wholly disposed to one side of the latter mentioned passage and located above the upper end of the first mentioned passage, and means for connecting the hopper and bottom member of the receptacle together and holding said parts associated with the receptacle.

In testimony whereof I have affixed my signature.

WILLIAM H. BENJAMIN.